(12) United States Patent
Sladky et al.

(10) Patent No.: US 7,555,387 B2
(45) Date of Patent: Jun. 30, 2009

(54) SYSTEM AND METHOD FOR PROVIDING TRAVEL RELATED PRODUCT INFORMATION ON AN INTERACTIVE DISPLAY HAVING NEIGHBORHOOD CATEGORIES

(75) Inventors: Dennis Sladky, Chicago, IL (US);
Jeffrey D. Sippel, Chicago, IL (US);
Ryan M. Lutterbach, Chicago, IL (US);
Andrew S. Day, Chicago, IL (US);
David S. Goodman, Chicago, IL (US);
Bradley D. Jaehn, Chicago, IL (US);
Andrew C. Zavattero, Wilmette, IL (US); Emilia A. Apostolova, Chicago, IL (US); Subashini B. Mangalam, Schaumburg, IL (US); Douglas R. O. Barth, Berwyn, IL (US); Anthony J. Czupryna, Skokie, IL (US)

(73) Assignee: Orbitz, L.L.C., Chicago, IL (US)

(*) Notice: Subject to any disclaimer, the term of this patent is extended or adjusted under 35 U.S.C. 154(b) by 0 days.

(21) Appl. No.: 11/337,858

(22) Filed: Jan. 23, 2006

(65) Prior Publication Data

US 2006/0173617 A1  Aug. 3, 2006

Related U.S. Application Data

(60) Provisional application No. 60/648,062, filed on Jan. 28, 2005.

(51) Int. Cl.
*G06F 19/00* (2006.01)
*B29C 45/00* (2006.01)
*G06F 7/00* (2006.01)

(52) U.S. Cl. ............... 701/211; 700/200; 700/211; 700/212; 705/5

(58) Field of Classification Search ............ 700/200, 700/211, 212; 705/5
See application file for complete search history.

(56) References Cited

U.S. PATENT DOCUMENTS 5,948,040 A * 9/1999 DeLorme et al. ............ 701/201

(Continued)

FOREIGN PATENT DOCUMENTS

WO  0164749 A1  8/2001

(Continued)

OTHER PUBLICATIONS

International Preliminary Report on Patentability for PCT/US06/02748 dated Feb. 1, 2008, 6 pgs.

(Continued)

*Primary Examiner*—Khoi Tran
*Assistant Examiner*—Ian Jen
(74) *Attorney, Agent, or Firm*—Wildman, Harrold, Allen & Dixon LLP

(57) ABSTRACT

A product location display system and method are provided that allow travel related product information, such as the geographic location of hotels, to be displayed on an interactive display. An application server of the product location display system receives user inputted criteria for a travel product search. A location management system determines a location for the travel product being searched based on the inputted criteria. Sub-locations associated with the geographic location being searched are pre-defined as being within the searched geographic location and stored within a location database memory component coupled with the location management system. A display configuration component of the location management system arranges and displays results of the search for the travel product by the sub-locations defined as being within the searched location.

2 Claims, 15 Drawing Sheets

U.S. PATENT DOCUMENTS

| | | | |
|---|---|---|---|
| 6,732,120 B1 * | 5/2004 | Du | 707/104.1 |
| 2001/0034661 A1 * | 10/2001 | Ferreira | 705/26 |
| 2003/0125994 A1 * | 7/2003 | Jaehn et al. | 705/5 |
| 2006/0069504 A1 * | 3/2006 | Bradley et al. | 701/211 |

FOREIGN PATENT DOCUMENTS

WO     WO 01/63479 A1 *  8/2001

OTHER PUBLICATIONS

International Search Report and Written Opinion of the International Searching Authority, PCT Patent Application No. PCT/US06/002748, Sep. 14, 2007, 9 pages.

International Preliminary Report on Patentability for PCT/US06/02748 dated Feb. 1, 2008, 6 pgs.

International Search Report and Written Opinion of the International Searching Authority, PCT Patent Application No. PCT/US06/002748, Sep. 14, 2007, 9 pages.*

* cited by examiner

SYSTEM AND METHOD FOR PROVIDING TRAVEL RELATED PRODUCT INFORMATION ON AN INTERACTIVE DISPLAY HAVING NEIGHBORHOOD CATEGORIES

CROSS REFERENCE TO RELATED APPLICATION

This application claims priority from U.S. Provisional Application No. 60/648,062 filed on Jan. 28, 2005.

FIELD OF THE INVENTION

The present invention relates to systems and methods for displaying travel related product information on a display device, and in particular, to such systems and methods for automatically creating an interactive display on a display device coupled with a computer system in response to a user search request for travel related products.

BACKGROUND OF THE INVENTION

With the advent of the Internet and the proliferation of travel related websites, more and more consumers are purchasing travel related products such as hotel accommodations on-line. The Internet advantageously allows consumers to access vast amounts of data regarding the products and services offered by many different providers. It is often desirable to display such data to consumers in a coherent and easily understood manner.

One approach to display a wide range of travel related product data is through the provision of matrix displays such as those shown in U.S. Patent Application Publication No. 2003/0125994 A1. In particular, this published patent application describes a hotel distance matrix display for displaying hotel data in response to a user performing an on-line search for hotel accommodations. Along the vertical axis of the hotel distance matrix display, a parameter representing the distance between a hotel and a point of interest is provided. A row heading for each row in the matrix indicates the distance range between the hotels retrieved in the search results and the designated point of interest (e.g. 0-1 mile, 1-5 miles, 5-10 miles, etc.). Along the horizontal axis are separate columns which represent hotels falling under certain hotel ratings according to a 1-5 star (*-*****) hotel rating scale. Various data element cells are defined by the intersecting rows and columns of the matrix. Thus, the data element cells in the hotel distance matrix represent room rates at various hotels which meet the distance and hotel rating criteria identified in the matrix headings for the particular data element cell.

At times however, consumers searching for a hotel may not be aware of particular points of interest in a town or city and thus, they perform searches identifying just a general location (e.g. town or city) of interest rather than specific points of interest. In such situations, some consumers may have difficulty deciphering a displayed hotel distance matrix due to the matrix not always providing a clear starting point for each distance segment and identifying the direction of each hotel in proximity from the starting point. Therefore, a need exists to improve the display of travel related product information in response to an on-line search request for such products.

DETAILED DESCRIPTION

A system and method for providing product information on an interactive display, in which the product information relates to particular geographic locations having predefined sub-location categories are shown and described. A product location display system which communicates with a display device, for example, via a communications network (such as the Internet) creates an interactive display that provides product information in an easily understood and coherent manner. In the context of the present specification, "products" may encompass services as well as tangible goods. By way of example only, the present specification describes embodiments related to the arrangement and display of travel related product information and, in particular, to hotel information meeting inputted criteria. However, it is understood that the present invention may encompass and apply to various products and is intended to be covered by the appended claims and their equivalents.

As will be shown and described below, users perform searches for travel products, such as hotel accommodations, by inputting selected criteria into a computer system having an associated display device. A product location display system determines a geographic location for the travel product (e.g. hotels) being searched based on the received search criteria. Geographic sub-locations such as neighborhoods within the geographic locations being searched are pre-defined and stored within the product location display system. The system arranges and displays the results of the hotel search by the sub-locations or neighborhoods defined as being within the searched geographic location. A regional map for the searched location having the associated sub-locations or neighborhoods identified on the regional map is displayed on the display device.

Figure 1:
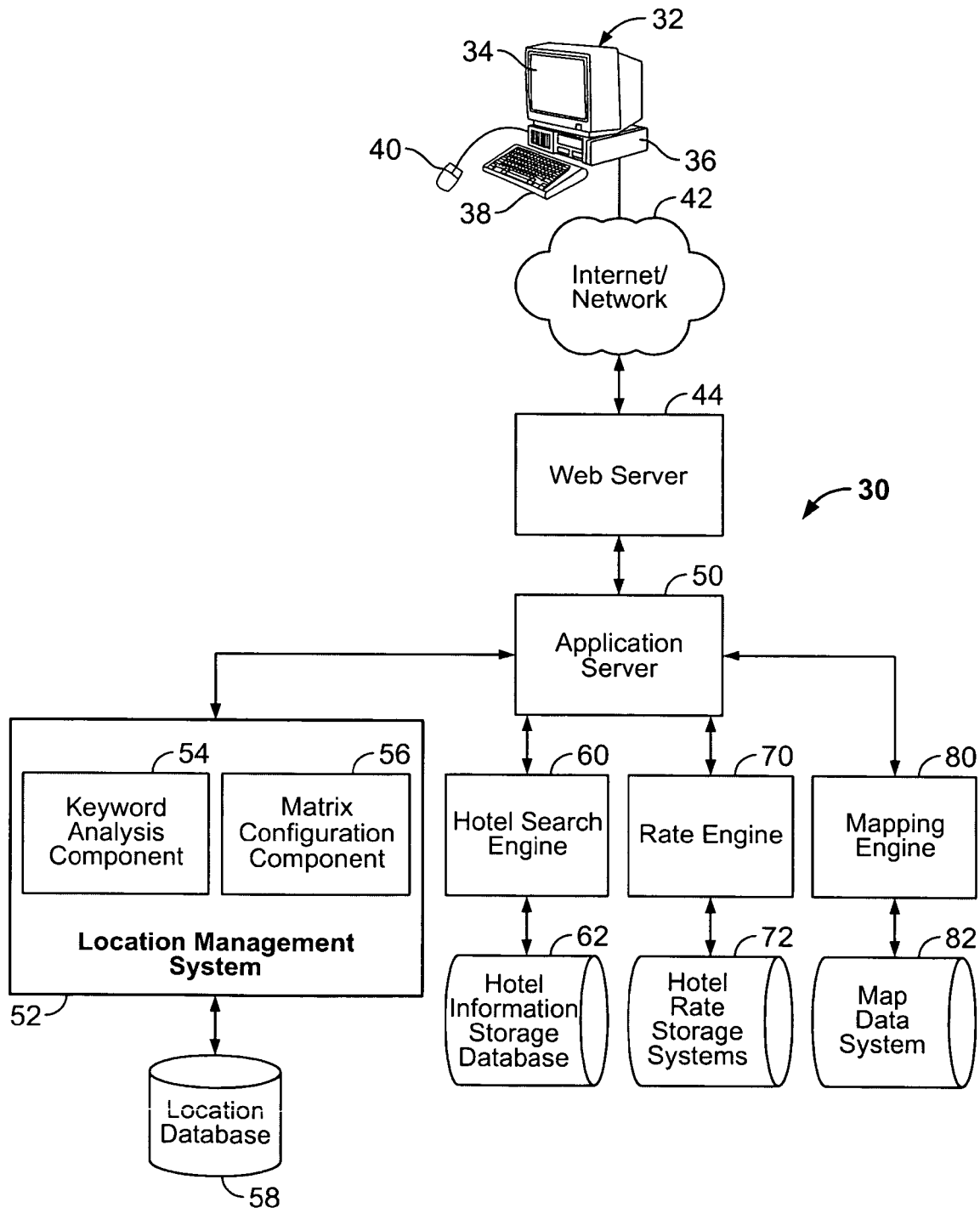
FIG. 1 is a block diagram of a product location display system coupled with a user terminal over a communication network.

Referring to FIG. 1, product location display system 30 for forming an interactive matrix display that provides hotel information for a selected geographic location by pre-defined neighborhood categories is shown. In this example, system 30 is an Internet based system in which users search for hotel rates and book hotel accommodations from their own World Wide Web enabled user terminal 32 or other software enabled display device. The user terminal 32 in this embodiment has a display device 34 coupled to a computer system 36 having user interface tools such as a keyboard 38 and mouse 40 for inputting data and performing user actions through the display device 34. The user terminal 32, in this example, includes a web browser program, which will allow a user to communicate over the Internet 42 (or other communication network) to a web server 44 which returns content back to the user terminal 32 via the Internet. For example, a user desiring to purchase hotel accommodations may use terminal 32 to contact web server 44. The user terminal 32 may be any type of display and communication device such as a desktop computer, laptop computer, workstation, PPA (personal digital assistant, mobile telephone or any other device that would allow a user to connect to a network server. Network 42 may, for example, be the Internet, or alternatively a LAN (local area network), a WAN (wide area network), a dial-up connection or any other communication network.

Web server 44 is a dedicated web server adapted to provide a network interface between the user terminal 32 and application server 50 of the product location display system 30. The web server 44 serves web pages to be displayed at display device 34 of the user terminal 32 in which the web pages are displayed by a web browser running on the user terminal 32. Various commands may also initially be sent by the system 30 to the user terminal 32 to be executed at the user terminal 32 such that certain display operations may be performed at the display device 34 independently of the web server 44. Web server 44 likewise receives input data entered by the user through user terminal 32 and transmitted to the web server 44 over the network 42. Much of the content displayed in the various web pages sent to the user terminal 32 from web server 44 is generated by the product location display system 30 based on communications between web server 44 and user terminal 32. However, the processing for generating the content and for carrying out instructions entered at user terminal 32 is performed by backend systems which are transparent to the user. The web pages sent to the user terminal 32 by web server 44 are displayed on the display device 34 and form a user interface by which the user interacts with the system 30.

Web server 44 is coupled to application server 50 which acts as an interpreter between the world wide web environment of the server 44 and the user terminal 32, and the back end systems that carry out the core logic and interactive display processes of the product location display system 30. Backend processing system components, including application server 50, location management system 52, hotel search application 60, rate engine 70 and mapping engine 80 process user requests and generate data which populate web pages sent from web server 44 to user terminal 32. It should be understood that web server 44 and application server 50 may alternatively be embodied in a single server device.

Application server 50 is a computer controlled component that manages the translation of user requests to backend system component requests, and stores data that will be used for subsequent user requests. Application server 50 communicates with location management system 52, having keyword analysis component 54 and matrix configuration component 56. Alternatively, location management system 52 may be embodied as part of the application server 50. Location management system 52 is coupled with location database memory component 58 which stores keyword related information, geographic location data, as well as configuration data to be used in configuring the hotel matrix display page, 600, FIG. 6. The location management system 52 interacts with the location database memory component to access keyword and location data used by the keyword analysis component 54 and matrix configuration data used by the matrix configuration component 56. The keyword analysis component 54 resolves keywords (received from user searches) to designated geographic locations stored in the location database memory component 58. The geographic locations, along with additional information such as latitude and longitude coordinate information and other information (such as zip codes, geographic boundaries, points of interest, etc.) is returned to the application server 50. The matrix configuration component 56 performs the function of capturing all necessary data that is required to create a hotel matrix display page 600, FIG. 6, having a neighborhood matrix display 610. The matrix configuration component 56 also receives requests for such matrix configurations from the application server 50 and returns the required information to the application server.

The hotel search engine 60 identifies hotels having relevant hotel information stored within the hotel information storage database 62 that may be associated with a particular geographic location. The rate engine 70 receives from application server 50 a list of hotels (previously generated by hotel search engine 60) that require rates. The rate engine 70 gathers the hotel rates from a variety of hotel rate storage systems 72. The hotel rate storage systems 72 may include local databases and external systems (such as a central reservation system). Mapping engine 80 receives mapping requests from application server 50 and forwards the requests to a remote map data system 82 which generates a neighborhood map (in digital electronic format). The mapping engine 80 also identifies features associated with the map generated, such as the locations of points to be plotted on the map by the web browser running at the user terminal 32. The application server 50 sends to the mapping engine 80 information regarding points (corresponding to hotel locations) that are to be plotted on a requested map. The mapping engine 80 sends data regarding the boundaries of the neighborhood map and the points to be plotted on the map to the remote map data system 82. The map data system 82 prepares a map in accordance with the information received and establishes a Universal Resource Locator (URL) web address to enable remote access of a sub-location map. The mapping engine 80 receives information returned by the map data system 82 regarding the location on the World Wide Web of the map generated (e.g. by the URL or web address) and the locations on the map (e.g. pixel locations) to plot points on the map. The mapping engine 80 extracts the URL (to access a created map) and the location of the pixel points to be plotted on the neighborhood map in order to send this information to the user terminal 32 for display of the neighborhood map with plotted points corresponding to hotel locations.

Figure 2:
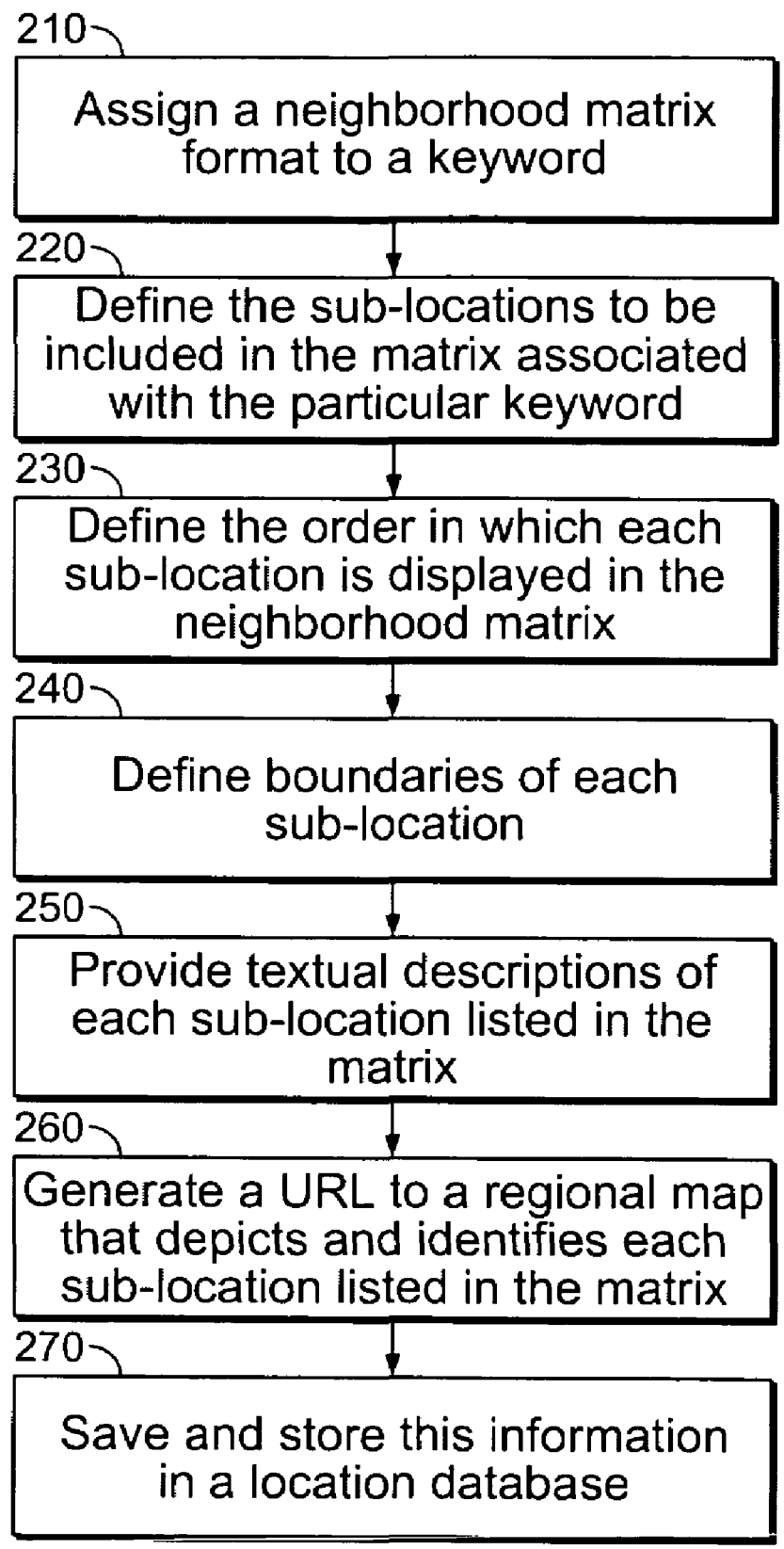
FIG. 2 is a flow chart illustrating the steps of setting pre-stored information used to create an interactive matrix display associated with a geographic region having neighborhood categories.

Referring now to FIG. 2, a flowchart illustrating the steps of pre-setting the location database memory component 58 for interaction with the keyword analysis component 54 and the matrix configuration component 56 of the location management system 52 to establish the creation of interactive neighborhood matrix displays is provided. The location database memory component 58 is provided with stored information that is accessed by the keyword analysis component 54 and the matrix configuration component 56 of the location management system 52 that is used in the formation of a hotel matrix display page 600, FIG. 6. In step 210, FIG. 2, the step of assigning a neighborhood matrix format for various keywords (received as search criteria) is performed. For instance, the word "Chicago" may be designated as having a neighborhood matrix display format for the display of search results in response to searches being performed for hotels in Chicago. In step 220, the sub-locations (or neighborhoods) to be included in the neighborhood matrix displays (that correspond to an assigned keyword) are defined. For example, a matrix display page corresponding to the assigned keyword "Chicago" may have pre-defined sub-locations of: "Magnificent Mile", "O'Hare Airport", "River North", "Lincoln Park" or any other pre-defined geographic sub-locations which come within the geographic location being searched. A default category may also be set for geographic regions within the location being searched that are not covered by the pre-defined sub-locations. Thus, a default category (e.g. named "other") for listing hotels that are geographically located outside of the pre-defined neighborhoods may be established.

Figure 6:
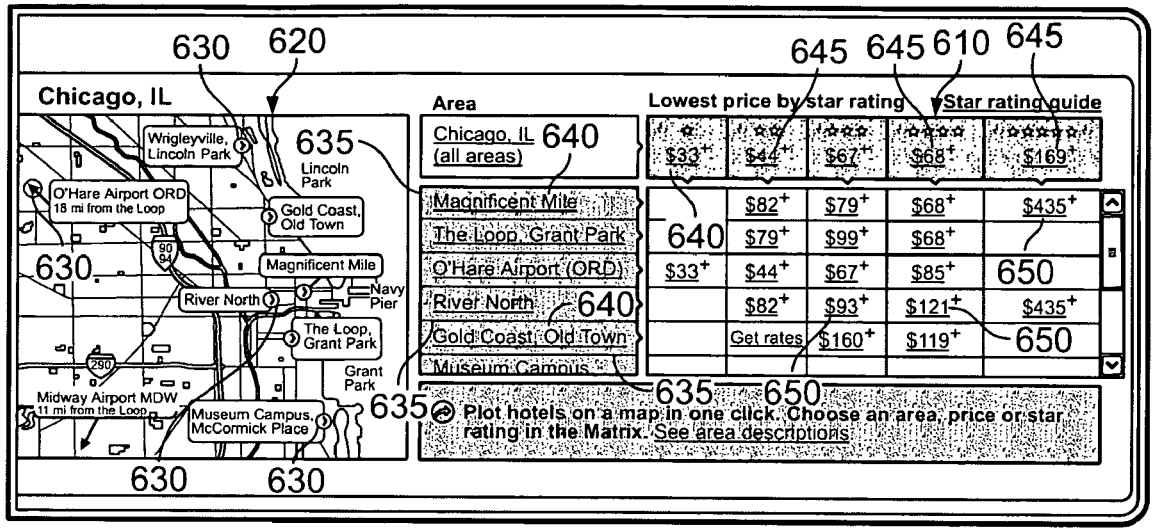
FIG. 6 is an example of a hotel matrix display page having neighborhood categories and a regional map.

The order in which each sub-location identifier is displayed on the neighborhood matrix display 610, FIG. 6, is defined in step 230, FIG. 2. The order on the matrix display in which the row headings corresponding to the pre-defined sub-locations are displayed is set in step 230. In step 240, FIG. 2, the boundaries of each sub-location associated with a geographic location (corresponding to a keyword) are defined and stored in the location database memory component 58. Boundary information is used to present users with a dynamic neighborhood map with plotted points representing hotel locations within a displayed sub-location. Defining boundaries may selectively include: drawing polygons around complex shapes; defining a radius from a center point, or using zip codes to determine boundaries of a given area.

In step 250, FIG. 2, text descriptions of each sub-location listed in the matrix display are provided and stored in location database memory component 58. A Universal Resource Locator (URL) providing a World Wide Web (www) address to a regional map (on the world wide web) that depicts and identifies each sub-location listed in the neighborhood matrix display (associated with a search keyword) is established in step 260, FIG. 2. In step 270, FIG. 2, this compiled information used for establishing hotel matrix display pages having neighborhood matrix displays is saved and stored in the location database memory component 58, FIG. 1.

Figure 3:
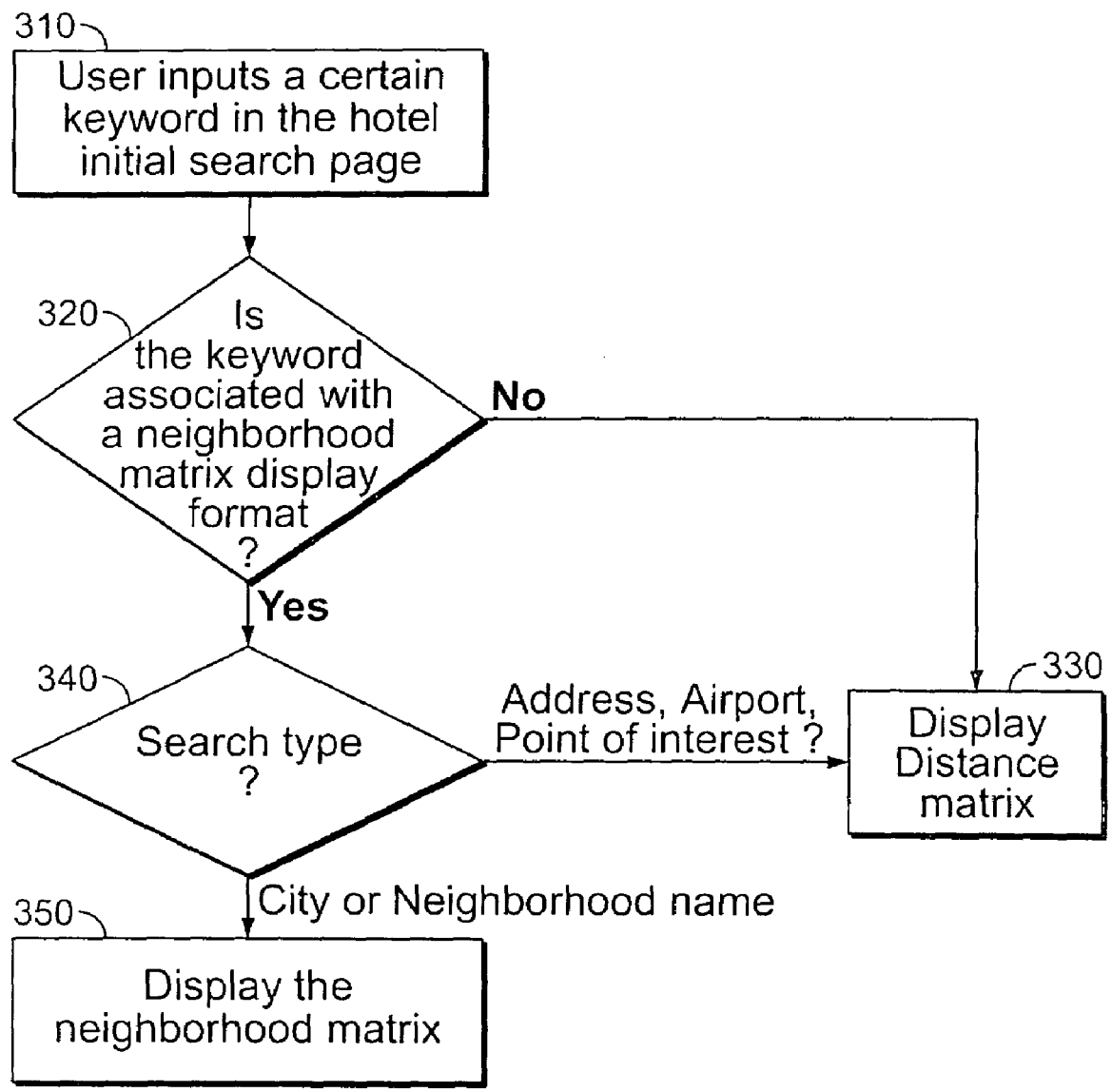
FIG. 3 is a flow chart illustrating the steps of determining a type of matrix to be displayed on a display device.
Figure 16:
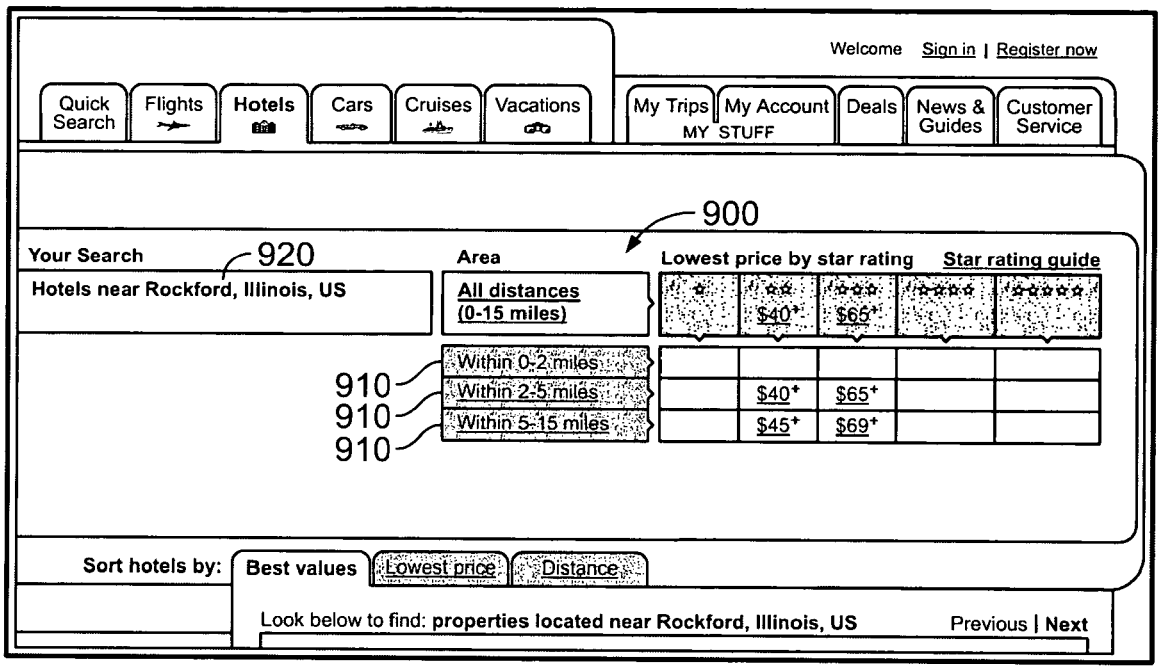
FIG. 16 is an example of a distance matrix display page.

Referring now to FIG. 3, a flowchart illustrating the steps of determining a type of matrix format to be displayed on a display device is provided. In step 310, a user at user terminal 32 inputs one or more keywords in an initial search page 500, FIG. 5, for performing a hotel search. For example, keywords inputted may selectively include a particular city name or geographic neighborhood name. Alternatively, keywords inputted may relate to a particular activity (e.g. ski, shopping, honeymoon, etc.) or a particular destination type (e.g. beaches, islands, etc.). In step 320, the keyword inputted at user terminal 32 is received via the Internet 42 at application server 50, FIG. 1, which sends received keywords to the keyword analysis component 54 of the location management system 52. The keyword analysis component 54 compares keywords received with a pre-stored list of keywords associated with a neighborhood matrix display. If the keyword received is not associated with a neighborhood matrix display, then in step 330, a distance matrix format, such as seen in FIG. 16, is used to display the hotel search results by fixed distance ranges. In step 340, FIG. 3, the keyword analysis component 54 determines the search type based on the search criteria inputted by the user in the initial search page 500, FIG. 5. If the inputted search criteria identifies an address, airport or point of interest search type then in step 330 a distance matrix 900 is used for display of the search results. If in step 340, the keyword analysis component 54 determines that the inputted search criteria identifies a city or neighborhood name, then in step 350, a neighborhood matrix display format is used to display the hotel search results.

Figure 4A:
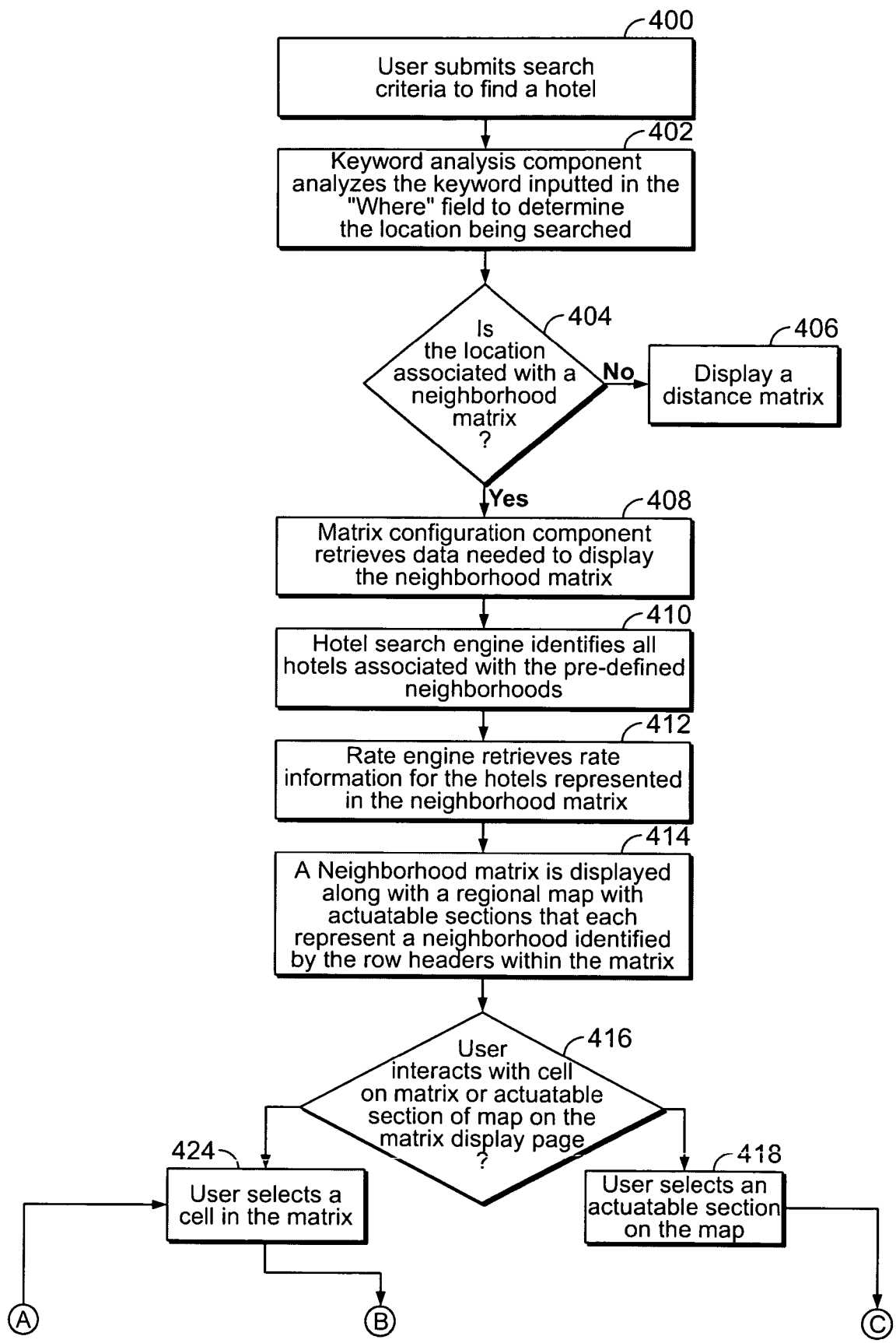
FIGS. 4A, 4B and 4C together provide a flow chart illustrating the steps of displaying hotel information on interactive displays in response to an on-line search for a hotel.
Figure 4B:
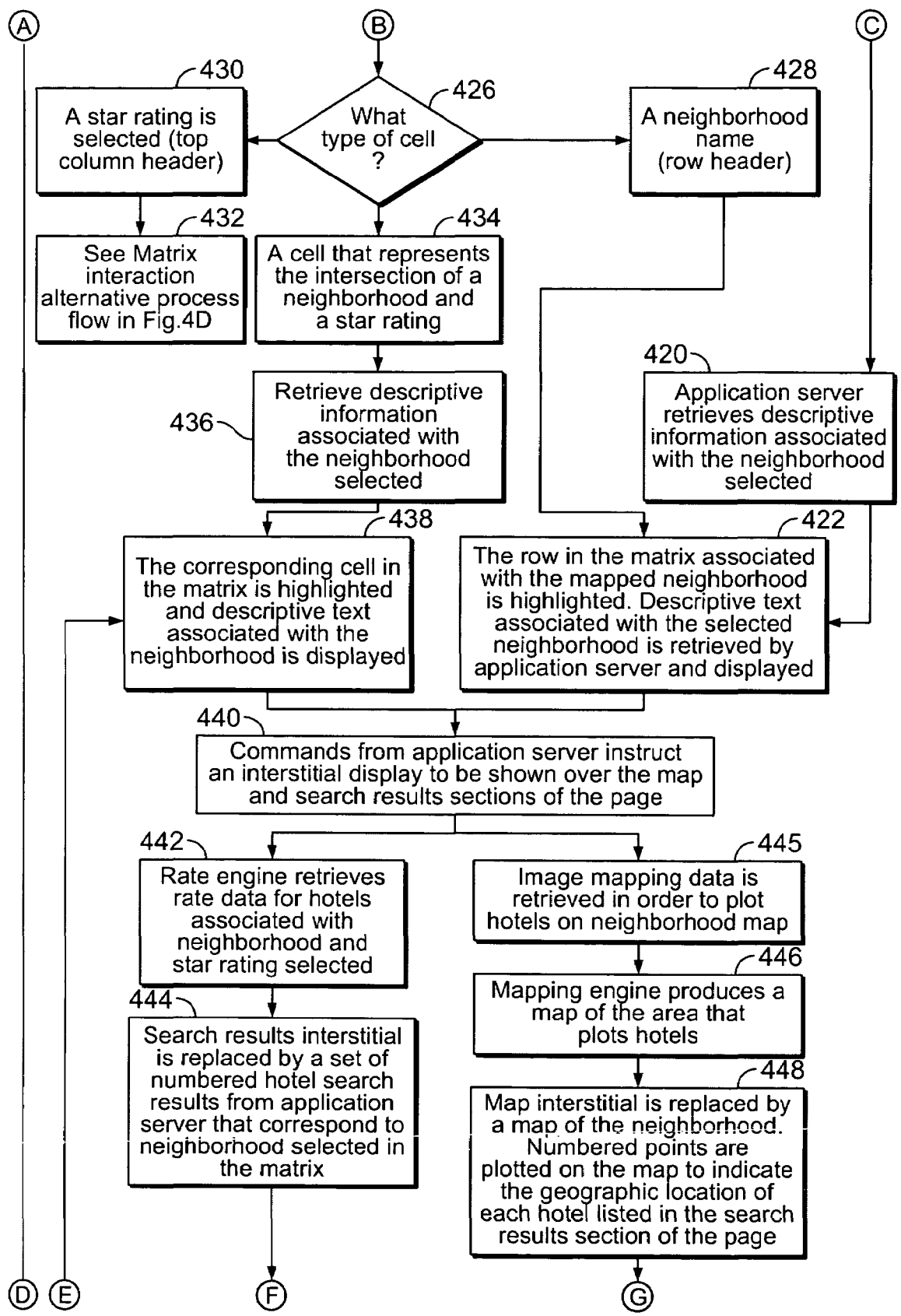
Figure 4C:
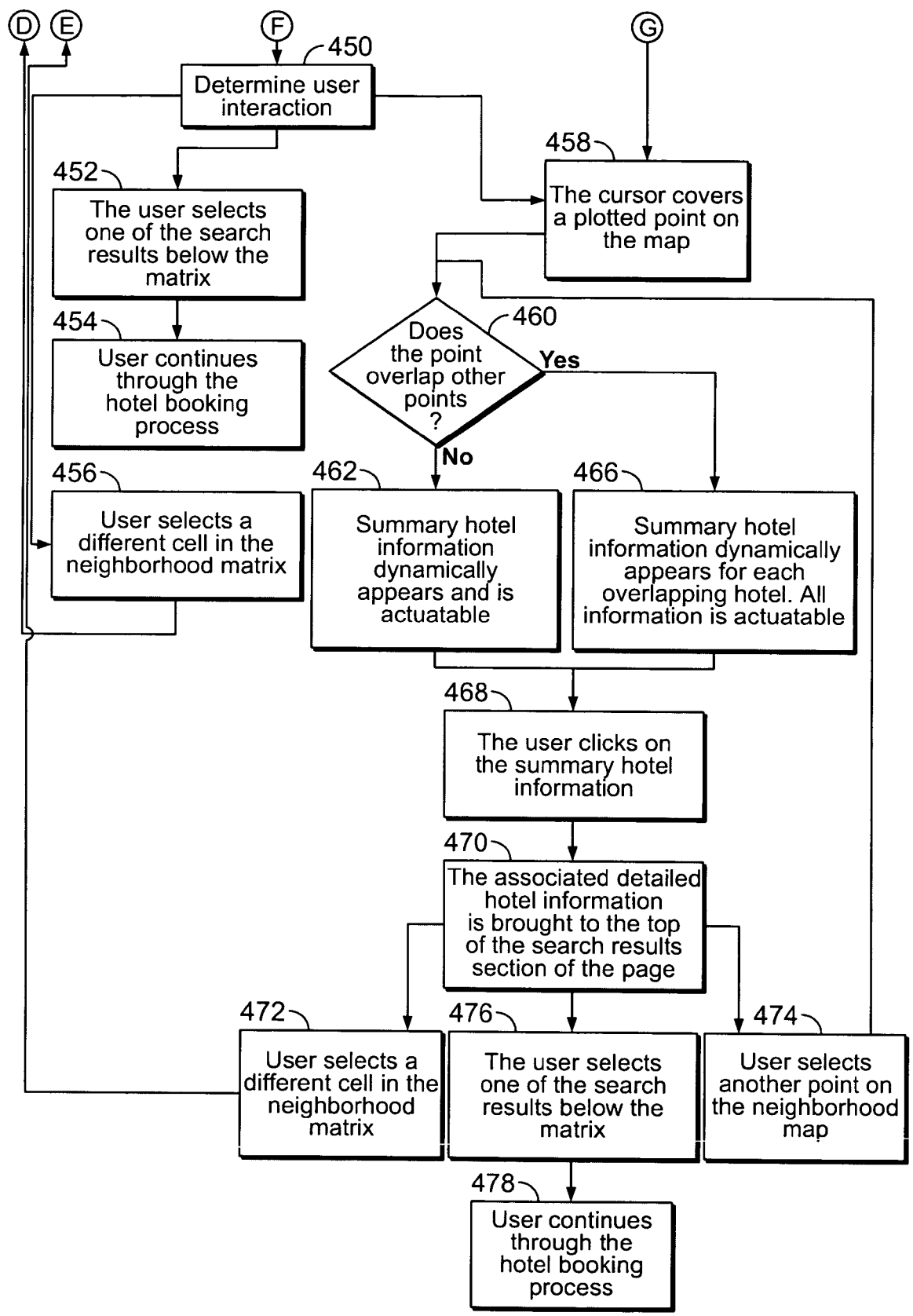
Figure 5:
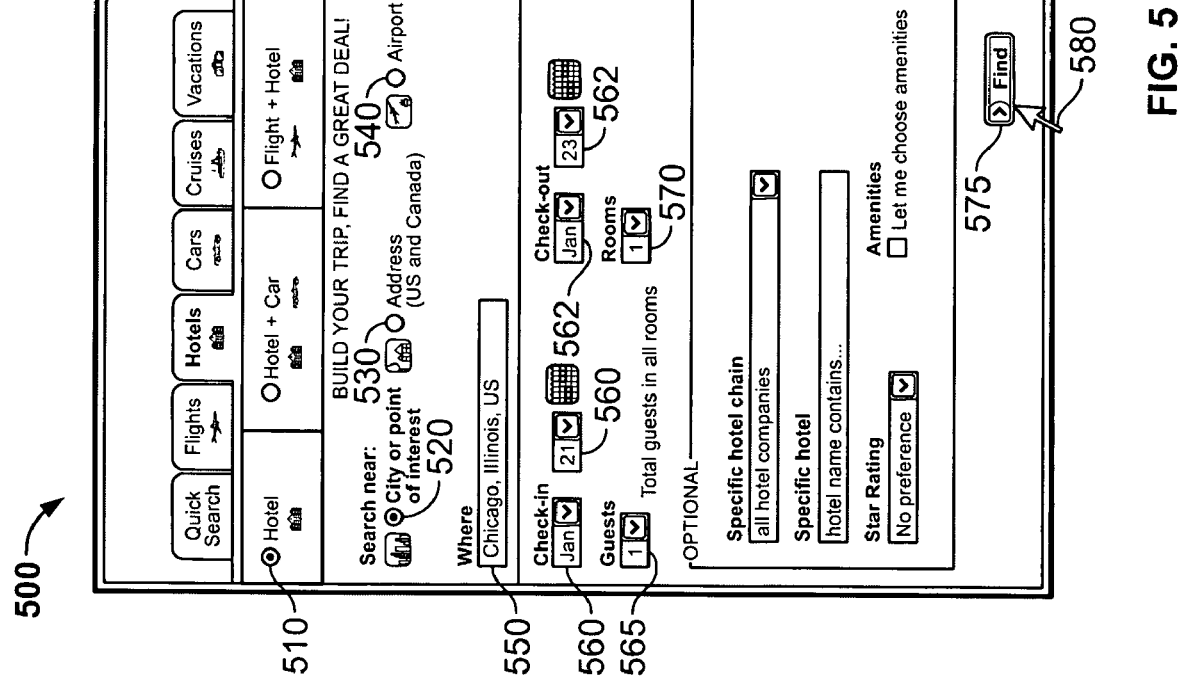
FIG. 5 is an example of an initial search page in which a user may enter search criteria for a hotel.

FIGS. 4A, 4B, and 4C together provide a flowchart illustrating the steps of displaying hotel information on interactive displays in response to an online search for hotels. Referring now to FIG. 4A, in step 400, user at user terminal 32 performs a travel product search by submitting search criteria to find a travel product, such as a hotel. In this example, user inputted search criteria may be entered at initial search page 500 as seen in FIG. 5. The initial search page 500 is sent from the web server 44, FIG. 1, to the user terminal 32 where it is displayed on display device 34 for the user. The initial search page 500, FIG. 5, that is displayed provides a user interface for communicating with product location display system 30, FIG. 1, and may selectively include data fields, drop down menus, radio buttons, software buttons, hypertext links, and other interactive features which allow the user to enter data and request searches on the system 30.

The initial search page 500, FIG. 5, includes a number of input options that allow the user to enter data criteria relating to his or her hotel search requirements. For instance, the user may search for hotels by selecting radio button 510. The location criteria for the search may be inputted by selecting a "city or point of interest" radio button 520, "address" radio button 530 or "airport" radio button 540. A "where" data field 550 is provided for the user to input location information for the hotel search to be performed. In this example, the city of Chicago, Ill. is the geographic location selected to be searched. Drop down menus for check-in 560 and check-out 562 dates, number of guests 565, and rooms 570 are also provided for inputting search criteria at initial search page 500, FIG. 5. Moving a cursor 580 on screen of display device 34 to actuate the "find" button 575 of search page 500 prompts the system 30 to perform a search for hotels in accordance with the inputted criteria. The application server 50, FIG. 1, formulates queries and sends the queries to the hotel search engine 60, which searches hotel information storage database 62 for information on hotels meeting the user requirements.

In step 402, FIG. 4A, application server 50, FIG. 1, sends location data from the received user inputted criteria to the location management system 52, and the keyword analysis component 54 analyzes one or more keywords inputted in the "where" data field 550, FIG. 5, to determine the geographic location being searched. In step 404, the location management system 52 determines the type of matrix format to be displayed on user terminal 32 based on one or more keywords received. In particular, the keyword analysis component 54 determines if the geographic location being searched is associated with a neighborhood matrix display. If not, in step 406, FIG. 4A, system 30 will display the search results on display device 34 in a distance matrix format 900 such as in the format seen in FIG. 16. As seen in FIG. 16, the row heading identifiers 910 relate to hotels found within a certain distance (e.g. 0-2 miles, 2-5 miles, 5-15 miles) from a point in the identified geographic location 920 being searched.

If the geographic location being searched is determined, by the keyword analysis component 54, FIG. 1, to be associated with a neighborhood matrix display format 610, FIG. 6, then in step 408, FIG. 4A, the matrix configuration component 56, of the location management system 52 retrieves data from location database memory component 58 that is needed to display the neighborhood matrix display associated with the identified geographic location. In particular, the matrix configuration component 56 accesses the pre-stored data for sub-locations or neighborhoods pre-defined to be associated with the geographic location being searched as described in FIG. 2. In this example, the data used in creating the framework for a neighborhood matrix display 610 for a particular geographic location includes boundaries of sub-locations, the order in which sub-locations are to be displayed, and descriptive text of the sub-locations.

In step 410, FIG. 4A, the application server 50 sends the inputted hotel search criteria to the hotel search engine 60 that forms the proper search queries to be sent to the hotel information storage database 62 in order to identify and retrieve information on all hotels associated with the pre-defined neighborhoods (in step 220, FIG. 2) for the location being searched. Geographic boundary information (originally stored in location and database 58) for the geographic location being searched, as well as for the sub-locations identified within the geographic location, is sent by the application server 50 to the hotel search engine 60. The hotel information storage database 62 stores latitude and longitude data (as well as star rating information) for each hotel. This hotel location data is compared to the geographic boundary information received from the hotel search engine 60 regarding each sub-location being searched in order to assign each hotel to a particular sub-location or sub-locations. In step 412, FIG. 4A, the application server 50, FIG. 1, directs rate engine 70 to retrieve rate information from the hotel rate storage systems 72 for the hotels determined by the hotel search engine 60 to be represented in the neighborhood matrix display.

The processing continues to step 414, FIG. 4A, in which system 30 obtains the information needed to create a hotel matrix display page 600, FIG. 6, having a neighborhood matrix display 610 to be displayed on user terminal 32 along with a regional map 620 having actuatable sections 630 that each represent a neighborhood identified by row headers 635 of the matrix display. As seen in FIG. 6, hotel matrix display page 600 has a neighborhood matrix display 610 and a regional map 620 corresponding to the geographic location (e.g. Chicago, Ill.) being searched. The application server 50, FIG. 1, obtains the information from the matrix configuration component 56, hotel search engine 60 and rate engine 70 and coordinates the arrangement and display of the results of the hotel search by the neighborhoods defined as being within the searched geographic location. The neighborhood matrix display 610 of FIG. 6 has a vertical axis and a horizontal axis in which sub-location identifiers 640 (such as neighborhood identifiers) are listed and displayed along the vertical axis, with each sub-location identifier 640 identifying one of the pre-defined sub-locations (such as pre-defined neighborhoods).

In the example seen in FIG. 6, the selection parameter defined by the vertical axis are the sub-locations (e.g. neighborhoods associated with Chicago, Ill. such as Magnificent Mile, Loop, O'Hare Airport, River North, Gold Coast, etc.) that are pre-defined as being within the searched location. Each row of the neighborhood matrix display corresponds to the identified neighborhood parameter. Thus, the neighborhood identifiers 640 in the row headings 635 of the matrix display 610 seen in FIG. 6 indicate that the first row relates to hotels in the "Magnificent Mile" sub-location, the second row relates to hotels in the "Loop, Grant Park" sub-location, and so forth. The selection parameter represented by the horizontal axis is the hotel rating according to a 1-5 star rating. In this example, each column represents hotels which received a common rating. In the hotel matrix display page 600 of FIG. 6, there are three different types of data element cells displayed. The neighborhood identifiers 640 serving as row headers are one type of data element cell, the star rating identifiers 645 serving as column headers are another type of data element cell, and matrix intersection data element cells 650 representing the intersection of a neighborhood and star rating serve as another type of data element cell. Each data element cell 650 defined by the intersecting rows and columns of the matrix corresponds to the respective parameters of the row and column for which it is located. Thus, in the neighborhood matrix display 610 of FIG. 6, the matrix intersection data element cells 650 represent room rates (e.g. lowest rates) at various hotels which meet the selection parameters of neighborhood location and hotel rating.

As seen in FIG. 6, the neighborhood matrix display 610 having neighborhood categories is positioned adjacent to a regional map 620 associated with the geographic location that is searched. The regional map 620 identifies each of the neighborhoods listed as row headers 635 in the neighborhood matrix display 610 and actuatable sections 630 are provided on the regional map that corresponds to the neighborhoods identified. As previously described, once the location management system 52 determines that the location for a hotel search has been pre-assigned to be associated with a neighborhood matrix display 610, the matrix configuration component 56 accesses the pre-stored data for the identified location from the location database memory component 58 and configures the matrix framework identifying the pre-selected neighborhoods as data element cells in the row headers 635 of the matrix display. The hotel search engine 60 searches for hotel information (such as latitude and longitude data or other geographic data) for hotels determined to be within the searched geographic location and its pre-determined sub-locations. The rate engine 70 obtains the room rates and rate description information for the hotels identified as meeting the search criteria.

The application server 50, FIG. 1, receives the rate information and populates data element cells 650, of the neighborhood matrix display 610 with information identifying the lowest room rate found for the corresponding sub-location and hotel rating associated with each data element cell. Additionally, in response to the determination that a neighborhood matrix display 610 is to be displayed for the geographic location being searched, the matrix configuration component 56 accesses a regional map 620, FIG. 6, associated with the searched location from a corresponding URL (Universal Resource Locator) which stores the regional map on the web. The matrix configuration component 56 also accesses information from the location database memory component 58 identifying the position of the actuatable sections 630 (appearing as icons), FIG. 6, on the regional map 620 when it is displayed on the display device 34. Once this information is obtained, the matrix configuration component 56 configures the neighborhood matrix display 610 for presentation along with the regional map 620 having actuatable sections 630 identifying the neighborhoods corresponding to those listed as row headers 635 on the matrix display.

Figure 7:
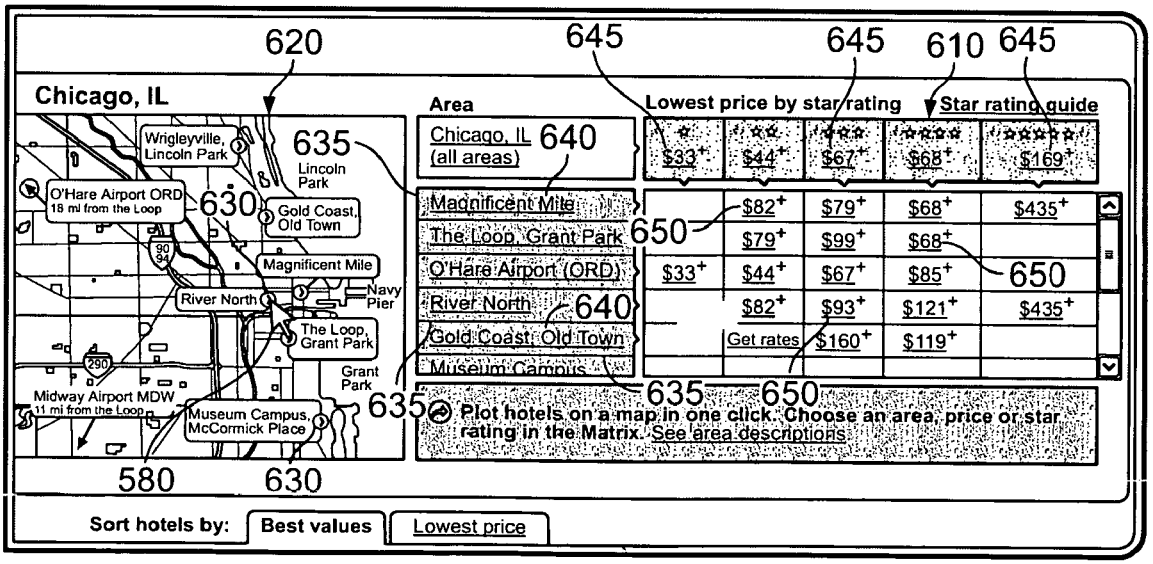
FIG. 7 is an example of the hotel matrix display page of FIG. 6 illustrating selection of an actuatable section on the regional map.

In step 416, FIG. 4A, user at user terminal 32 interacts with the hotel matrix display page 600, FIG. 6, and the system 30 determines if a data element cell 640, 645, 650 on the matrix or an actuatable section 630 on the regional map 620 displayed was selected. The web browser operating at the user terminal 32 is able to determine which regions on the screen of the display device 34 are selected, for example, by cursor 580 movement and "mouse clicking" or other user actuation on the display screen. The user terminal 32, FIG. 1, then signals the application server 50 to inform the system 30 of the user selection. If an actuatable section 630 on the regional map 620, for example as seen in FIG. 7, is selected in step 418, FIG. 4A, then the processing moves to step 420, FIG. 4B, in which the application server 50 retrieves descriptive text associated with the neighborhood selected and identified at the actuatable section 630. For instance, as seen in FIG. 7, the cursor 580 is moved to an actuatable section 630 for the "River North" neighborhood. Upon selection of the actuatable section 630, the processing moves to step 422, FIG. 4B, in which the row 655, FIG. 10, in the neighborhood matrix display 610, associated with the selected neighborhood is highlighted. Descriptive text 660, FIG. 10, associated with the selected neighborhood is retrieved by application server 50 and displayed on the display device 34. Processing then moves to step 440, FIG. 4B.

Figure 9:
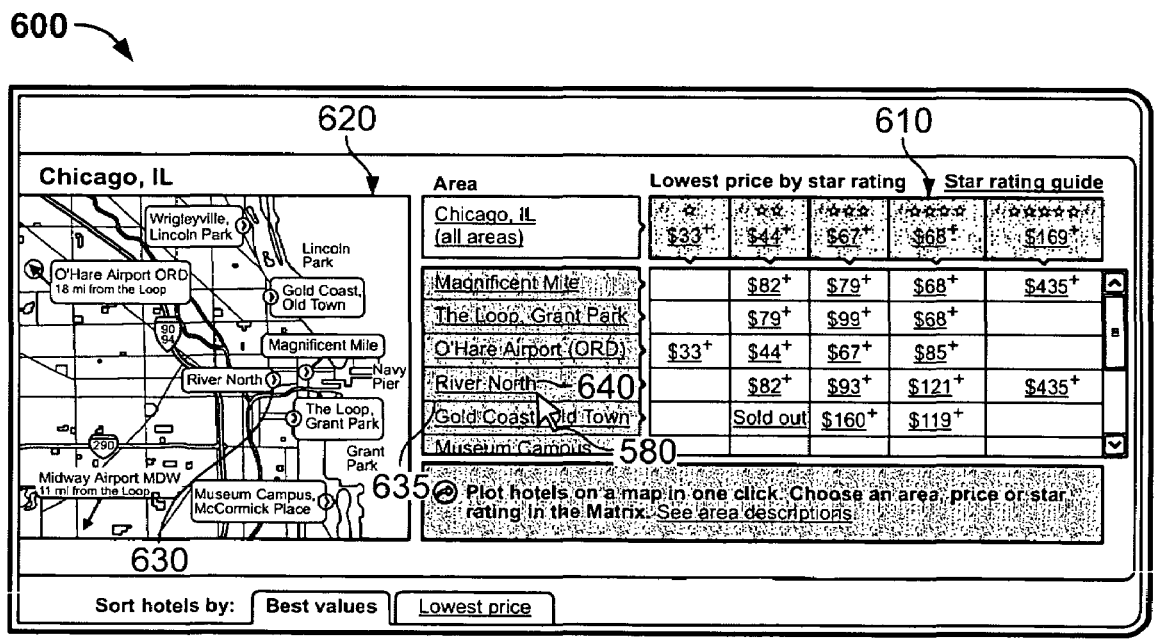
FIG. 9 is an example of the hotel matrix display page of FIG. 6 illustrating selection of a data element cell in a row heading having a neighborhood identifier.
Figure 10:
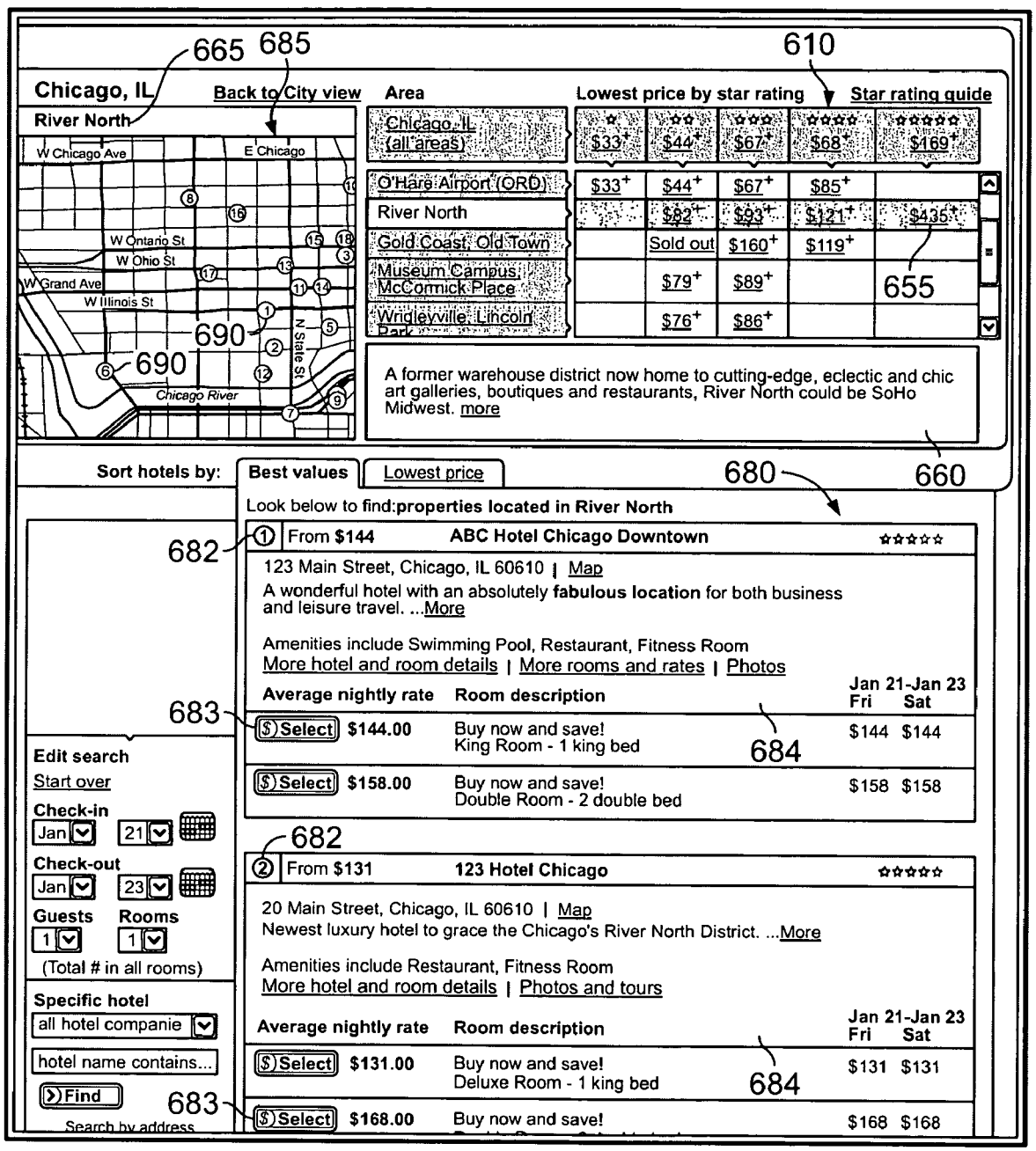
FIG. 10 is an example of a hotel matrix display page having neighborhood categories and a display of a neighborhood map associated with a neighborhood identifier of the data element cell selected in FIG. 9.

If the application server 50, FIG. 1, determines in step 424, FIG. 4A, that selection of a data element cell 640, 645, 650 in the matrix display 610, FIG. 6, has been made, then in step 426, FIG. 4B, the application server 50 determines the type of data element cell that was selected. The application server 50 determines this based on which areas of the screen of display device 34 are selected. If it is determined in step 428, FIG. 4B, that a neighborhood identifier data element cell 640 in a row heading 635 of the neighborhood matrix display 610, as seen in FIG. 9, was selected, then the process then moves to step 422. As seen in FIG. 10, the row 655 in the matrix display 610 associated with the mapped neighborhood 665 is highlighted and descriptive text 660 associated with the selected neighborhood is retrieved by the application server 50 and displayed. Processing then moves to step 440, FIG. 4B.

Figure 4D:
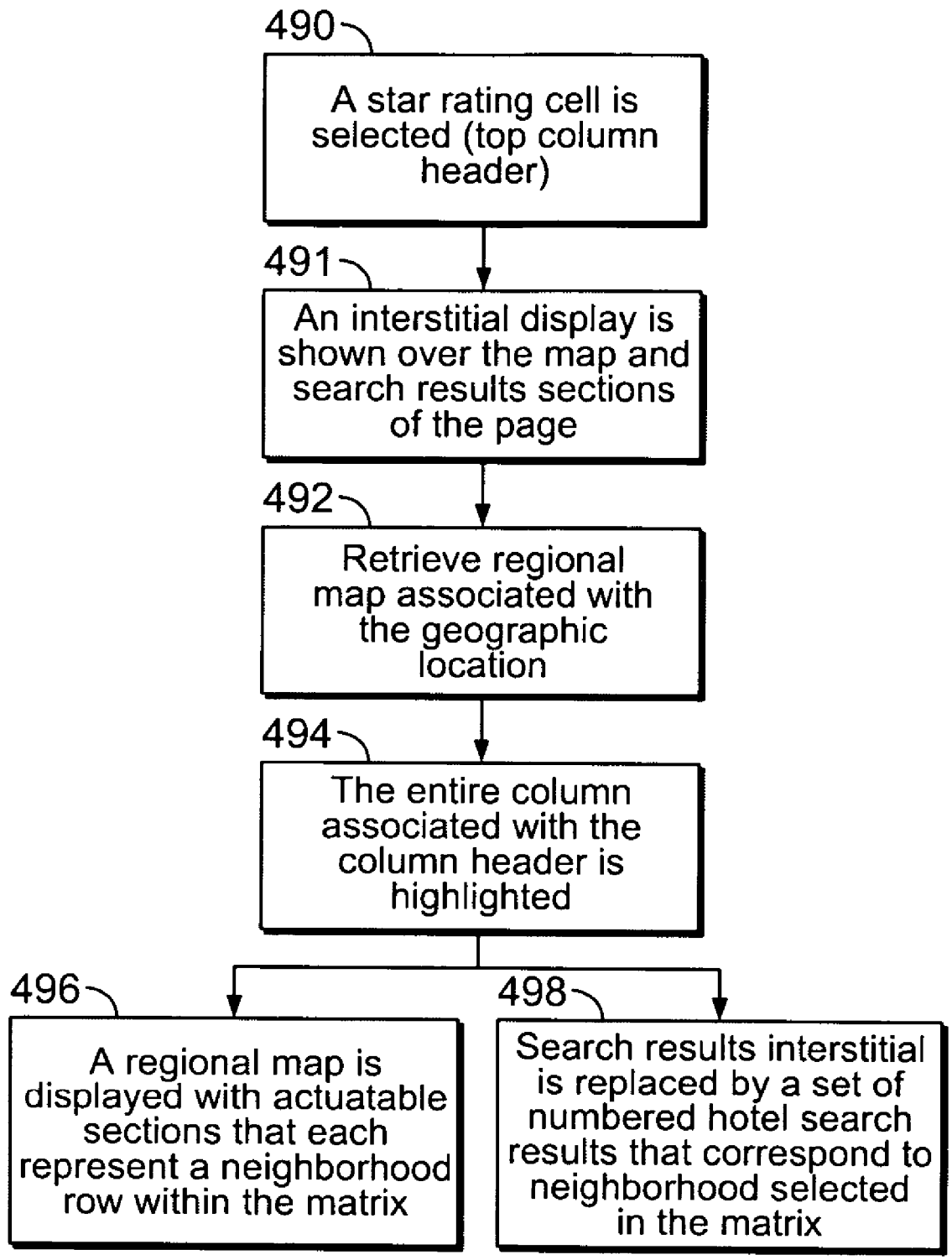
FIG. 4D is a flow chart illustrating the process flow upon user interaction with a column header data element cell of a hotel matrix display page.
Figure 17:
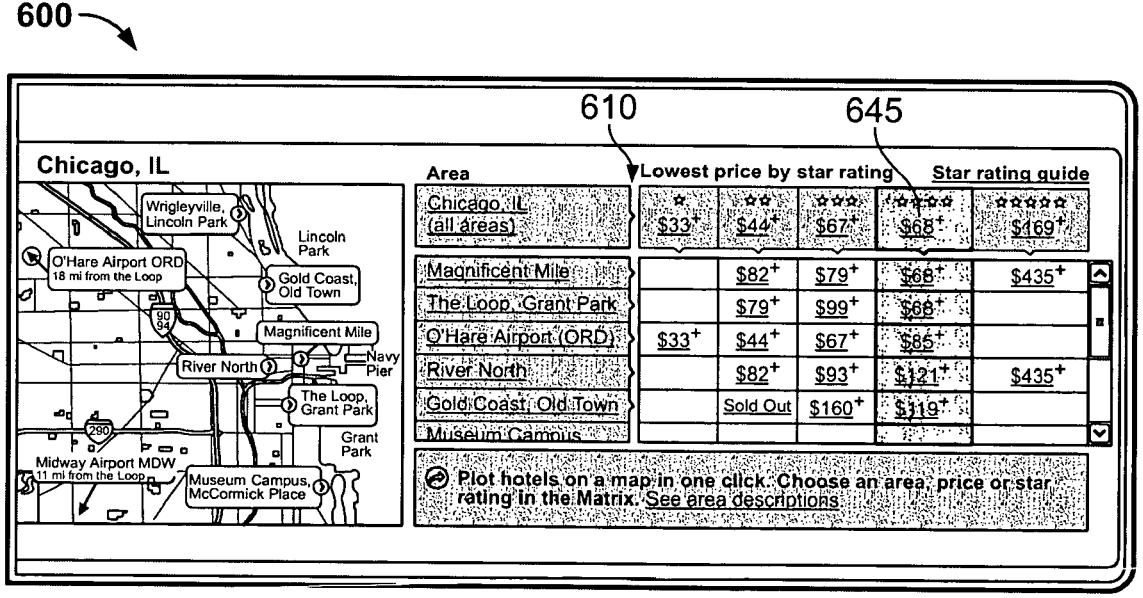
FIG. 17 is an example of the hotel matrix display page of FIG. 6 illustrating selection of a column header.

If in step 426, FIG. 4B, the application server 50 determines that a star rating data element cell 645, FIG. 17, is selected in step 430, FIG. 4B, then the processing moves to step 432 in which the system 30 follows an alternative process flow as seen in FIG. 4D for further interaction at the matrix display. Referring now to FIG. 4D, in step 490, the application server 50 determines that a star rating data element cell 64, FIG. 17, is selected from a column header of the neighborhood matrix display. In step 491, FIG. 4D, an interstitial display is placed over the map and search results sections of the hotel matrix display page 600. (See FIG. 12) In step 492, a regional map associated with the geographic location being searched is retrieved from the location management system 52. In step 494, the entire column associated with the column header is highlighted as seen in FIG. 17. The processing then moves to step 496, FIG. 4D, in which the application server 50 directs the regional map 620 having actuatable sections that each represent a neighborhood within the neighborhood matrix display 610 to be displayed on the web page 600. In step 498, the search results interstitial 675 is replaced by a set of numbered hotel search results that correspond to the neighborhoods (and star rating) selected in the matrix display 610.

Figure 8:
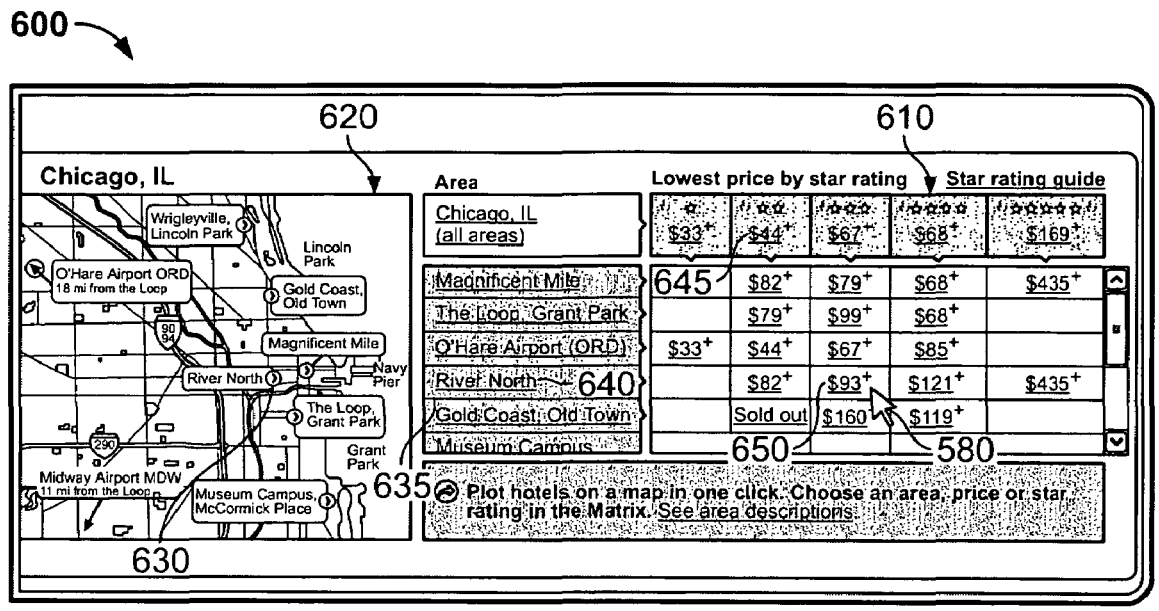
FIG. 8 is an example of the hotel matrix display page of FIG. 6 illustrating selection of a data element cell.
Figure 11:
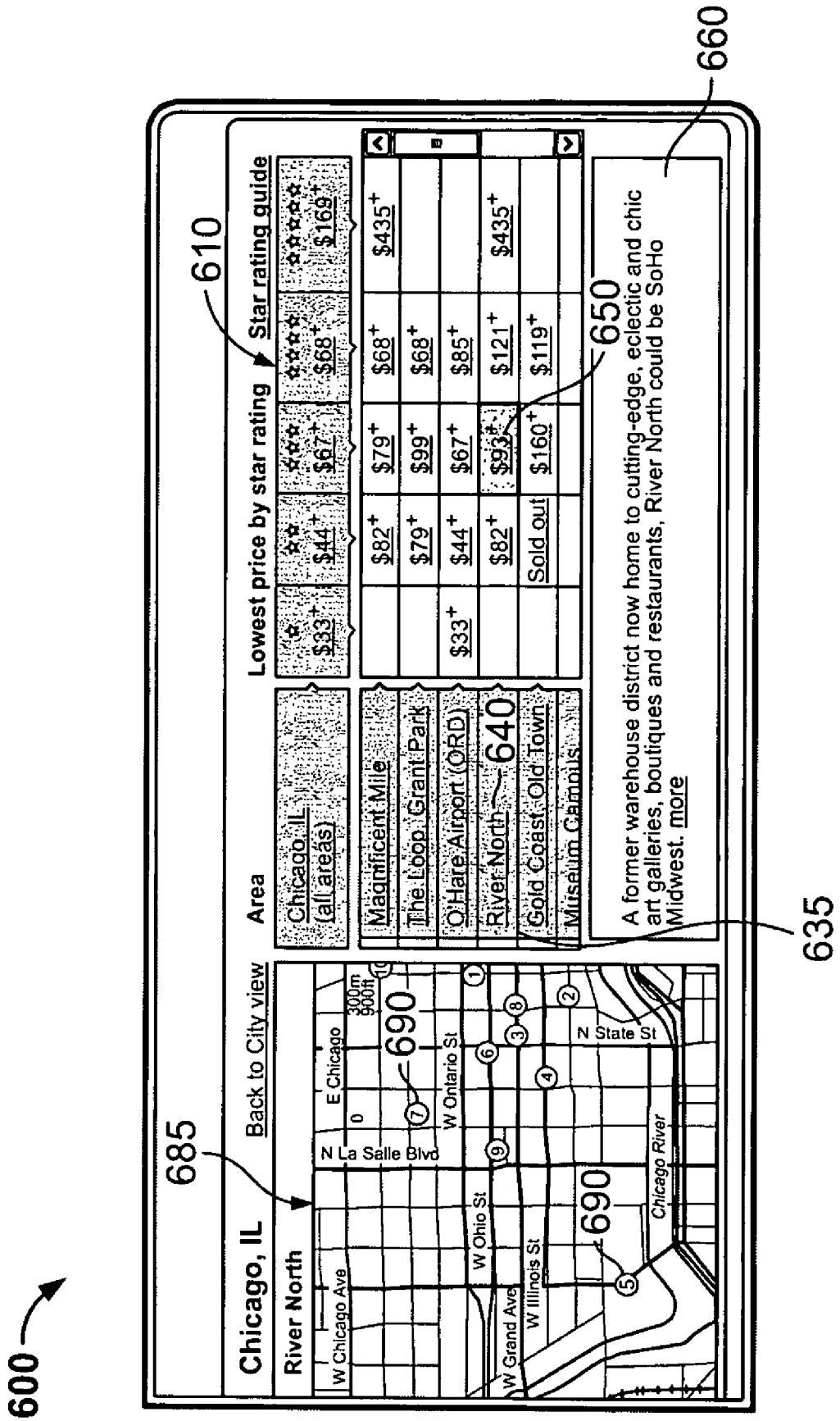
FIG. 11 is an example of a hotel matrix display page having neighborhood categories and a display of a neighborhood map associated with the neighborhood corresponding to the data element cell selected in FIG. 8.

If in step 434, FIG. 4B, the application server 50 determines that the data element cell 650 selected represents an intersection of an identified neighborhood and a star rating as seen in FIG. 8, then the processing moves to step 436, FIG. 4B, in which the application server 50, FIG. 1, retrieves descriptive information associated with the neighborhood selected as identified by the neighborhood identifier at the row heading 635 for the data element cell 650, FIG. 8, selected through cursor 580. In step 438, FIG. 4B, the corresponding data element cell 650 in the matrix display 610 is highlighted as seen in FIG. 11, and descriptive text 660 associated with the neighborhood is displayed.

Figure 12:
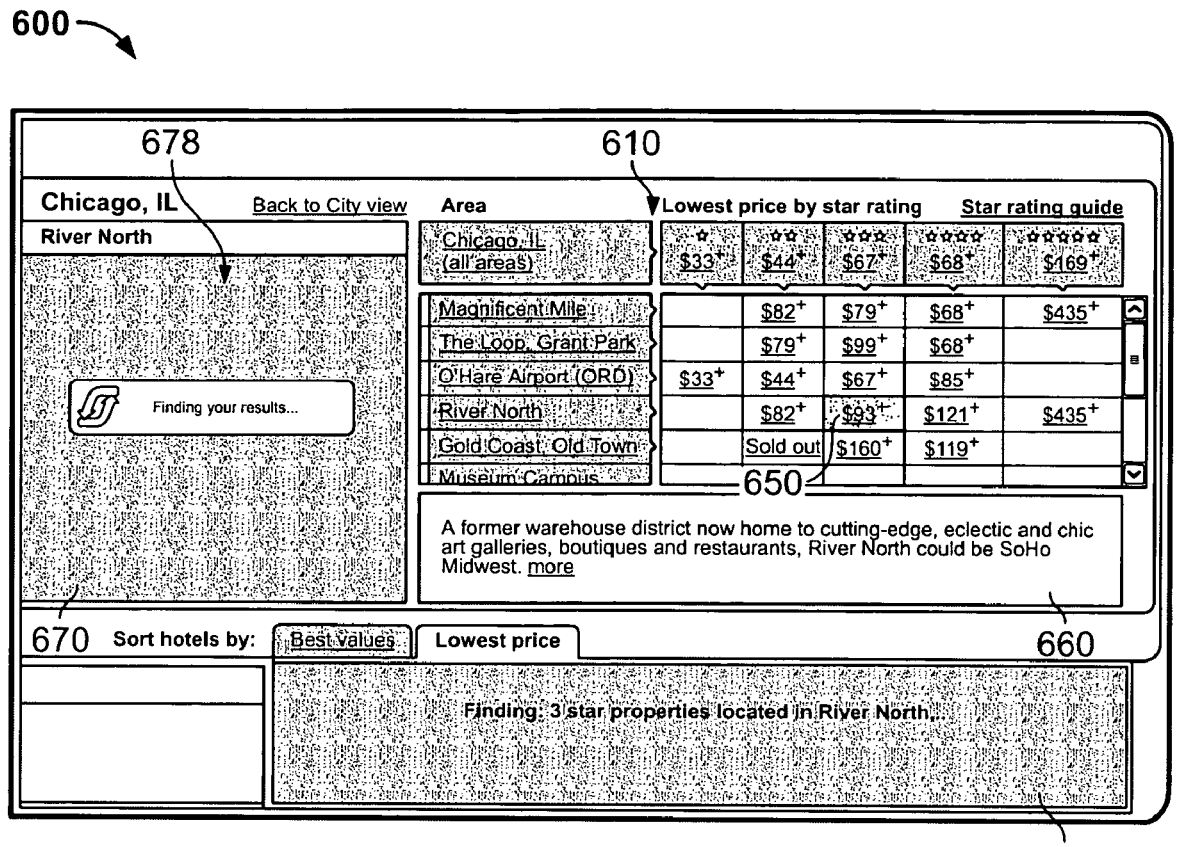
FIG. 12 is an example of a hotel matrix display a page having neighborhood categories with an interstitial display shown over a neighborhood map and a search results section.

The processing then moves to step 440, FIG. 4B, in which the application server 50, FIG. 1, sends commands to the browser script operating at user terminal 32 instructing that interstitial displays 670, 675, see FIG. 12, that are non-interactive images be shown over the regional map section 678 and search results section 680 of the hotel matrix display page 600. The application server 50, FIG. 1, instructs the web browser associated with the display device at user terminal 32 to place a non-interactive image over these discrete sections of the hotel matrix display page 600. In step 442, FIG. 4B, the rate engine 70, FIG. 1, retrieves hotel rate data from the hotel rate storage systems 72 for hotels associated with the neighborhood and hotel rating(s) corresponding to the selected data element cell 650. In step 444, the application server 50, FIG. 1, replaces the search results interstitial 675, FIG. 12, with a set of numbered hotel search results 682, FIG. 10, that correspond to hotels located in the neighborhood selected in the hotel matrix display page 600.

Changes to the regional map section 678 also occur when the interstitial 670, FIG. 12, is displayed. In particular, the regional map 620, FIGS. 7-9, is replaced with a neighborhood map 685 corresponding to the neighborhood selected. In step 445, FIG. 4B, image mapping data is retrieved in order to plot points corresponding to hotel locations on a neighborhood map 685. In step 446, FIG. 4B, the mapping engine 80, FIG. 1, produces a map of the area for the selected neighborhood that will have plotted points 690, FIG. 11, corresponding to the location of hotels found from the search results.

In step 448, FIG. 4B, the map interstitial 670 is replaced by a neighborhood map 685. The application server 50 sends a request to the mapping engine 80 along with geographic boundary information (for the neighborhood sub-location) and information regarding points (corresponding to hotel locations) to be plotted on the neighborhood map. The remote map data system 82 obtains this information from the map engine 80, creates a map (accessible through the world wide web) and sends back a URL web address to the mapping engine 80 along with information identifying the location of the points to be plotted on the map. The URL and plotted point information are sent to the user terminal 32 to provide access to the neighborhood map (generated at the remote map data system) and to enable points to be plotted on the map and displayed at display device 34 at the appropriate pixel locations. A number of points 690 are plotted on the neighborhood map 685 displayed in which the plotted points are associated with geographic locations of hotels found within the neighborhood selected. Each of the points 690 plotted are numbered to correspond with an associated hotel listed in the search results section 680, FIG. 10, of the interactive hotel matrix display page 600. The plotted points 690 are numbered in accordance with how they are displayed in the search results section 680. Additionally, the list of plotted points returned by the mapping engine 80 is inspected by the application server 50 to determine if any overlapping of the plotted points occurs.

In step 450, FIG. 4C, the application server 50 determines the type of user interaction that occurs at the interactive hotel matrix display page 600, seen in FIG. 10. In step 452, the system 30 determines that the user has selected one of the search results 684, FIG. 10, in the search results section 680 by activating a "select" button 683 in the search results section. In step 454, FIG. 4C, the user moves to the hotel booking process (controlled by a booking server—not shown) to book the selected hotel. If in step 456, the application server 50, FIG. 1, determines that the user has selected a different data element cell 640, 645, 650 in the neighborhood matrix display 610 then the processing returns to step 424, FIG. 4A.

Figure 13:
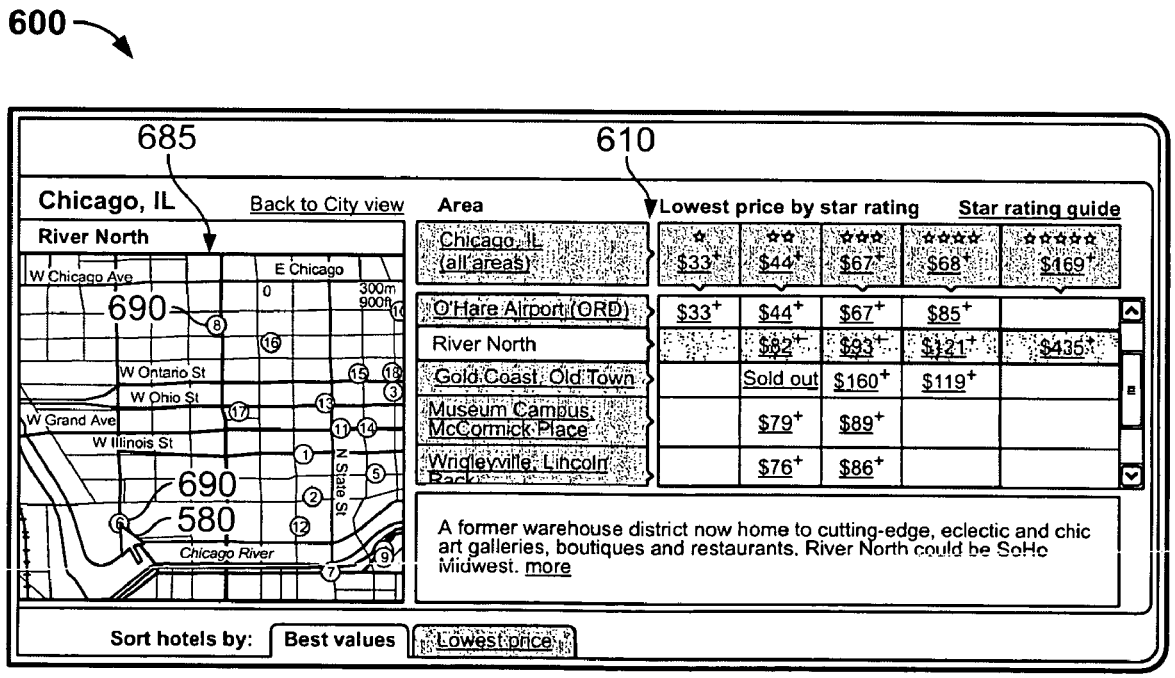
FIG. 13 is an example of a hotel matrix display page illustrating a cursor crossing a plotted point associated with a hotel on a neighborhood map.
Figure 14:
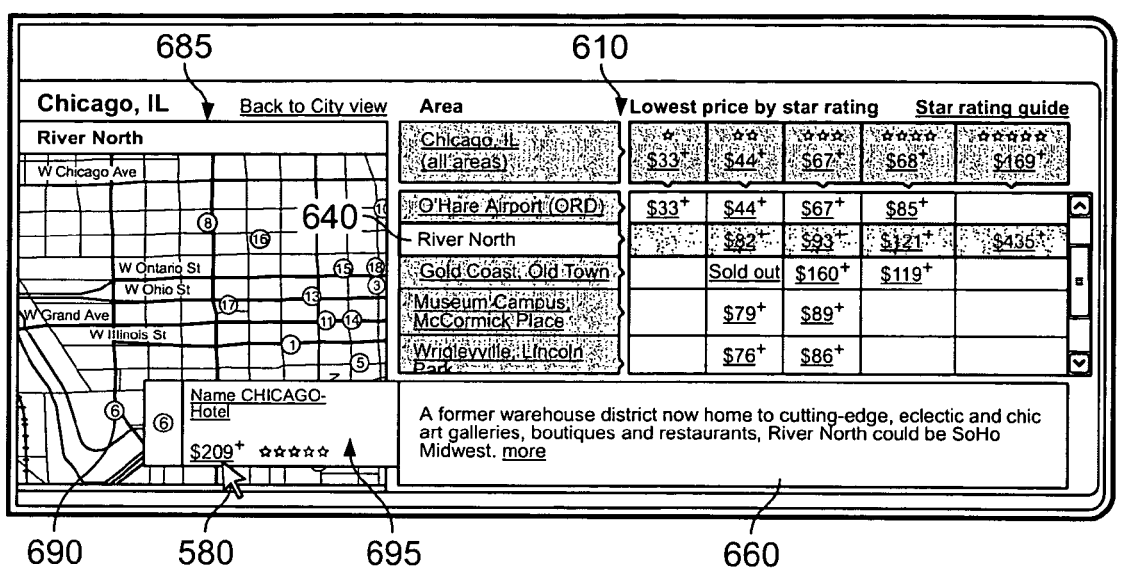
FIG. 14 is an example of a hotel matrix display page displaying summary hotel information on a neighborhood map.

In step 458, FIG. 4C, the system 30, FIG. 1, determines that the cursor 580, FIG. 13, interacts with a plotted point 690 on the neighborhood map 685. In step 460, FIG. 4C, the mapping engine 80, FIG. 1, determines if the plotted point 690 overlaps with any other plotted points by inspecting pixel locations of the plotted points. If the plotted point 690, FIG. 13, does not overlap any other plotted points 690, then in step 462, FIG. 4C, summary hotel information as seen in FIG. 14, dynamically appears on the neighborhood map 685 and adjacent to the plotted point 690 corresponding to a particular hotel. The summary hotel information 695 displayed that is associated with a particular hotel located as shown on the neighborhood map 685 may, for example, include the hotel name, hotel room price information, and the hotel star rating. A portion of the neighborhood map 685 is overlayed with a display section containing the summary hotel information 695. The summary hotel information 695, FIG. 14, displayed is placed on a dynamic data element (embodied in a tool tip such as a hyperlink) and is thus, actuatable for dynamic interaction and selection by the user. If the mapping engine 80, FIG. 1, determines that the cursor 580 is covering a plotted point 690 that overlaps other plotted points, then in step 466, FIG. 4C, summary hotel information 695 for each hotel corresponding to an overlapping point dynamically appears on the neighborhood map adjacent to the overlapping points. All the summary hotel information displayed is actuatable.

Figure 15:
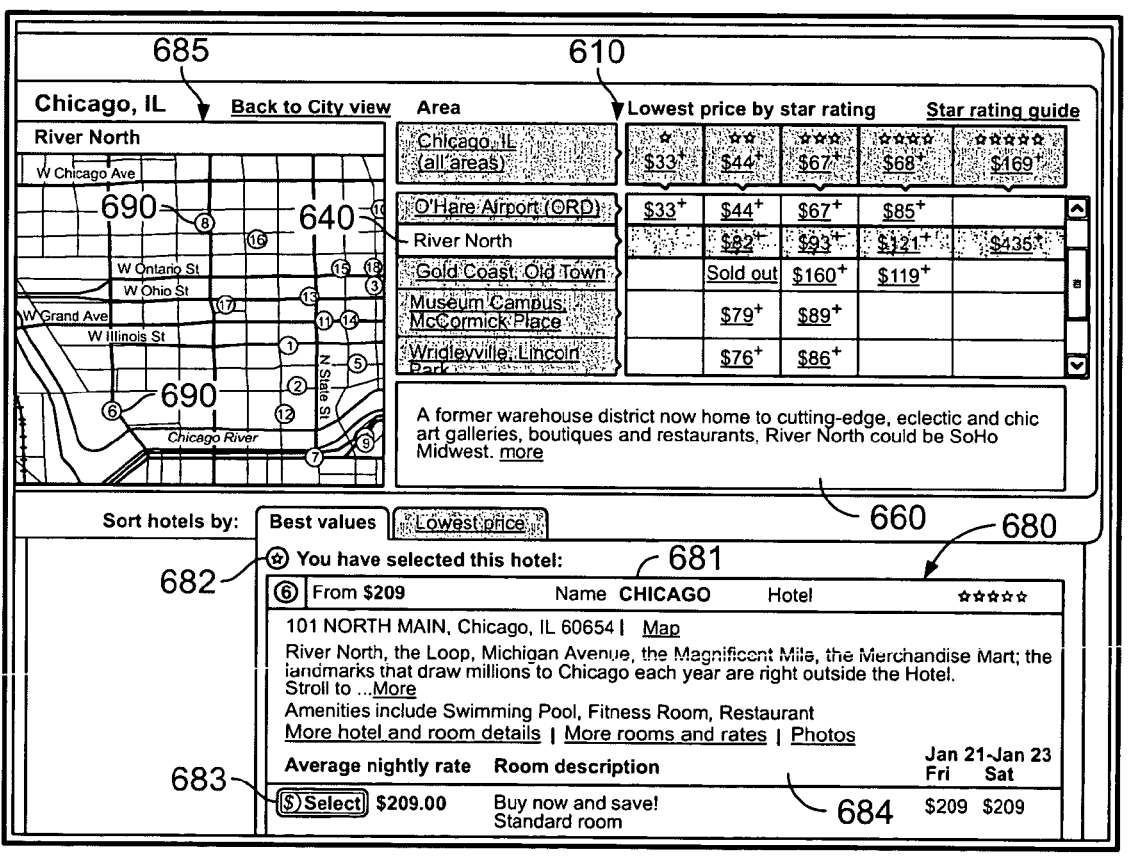
FIG. 15 is an example of a hotel matrix display page illustrating movement of detailed hotel information associated with a plotted point to the top of a search results section of the page.

In step 468, FIG. 4C, system 30 determines that the user has clicked on the summary hotel information 695, FIG. 14. This may be accomplished by pre-set commands sent by application server 50, FIG. 1, to the browser operating at user terminal 32 when the hotel search results are initially returned for display at display device 34. Upon the user actuating summary hotel information 695, FIG. 14, in step 470, FIG. 4C, the detailed hotel information 684, associated with the hotel corresponding to the plotted point 690 that is displayed and listed in the search results section 680 is moved to the top 681 of the search results section as seen in FIG. 15. Movement of the detailed hotel information 684, FIG. 15, to the top 681 of the search results section 680 is performed by pre-set commands which operate in response to user selection of the dynamically displayed summary hotel information 695, FIG. 14.

In step 472, FIG. 4C, the user selects a different data element cell in the neighborhood matrix display 610, FIG. 15, and the processing returns to step 438, FIG. 4B. In step 474, FIG. 4C, the user selects another point 690 on the neighborhood map 685, FIG. 15, and the processing returns to step 460, FIG. 4C. In step 476, the user selects one of the search results 684 in the search results section 680 displayed below the neighborhood matrix display 610 by activating a "select" button 683, FIG. 15, shown in the search results section. The processing continues to step 478, FIG. 4C, in which booking of the selected hotel room in accordance with the detailed information displayed is performed through use of a hotel booking application (not shown).

The foregoing description of the preferred embodiments of the invention have been presented for purposes of illustration and description, and are not intended to be exhaustive or to limit the invention to the precise forms disclosed. The descriptions were selected to best explain the principles of the invention and their practical application to enable other skills in the art to best utilize the invention in various embodiments and various modifications as are suited to the particular use contemplated. It is intended that the scope of the invention not be limited by the specification, but be defined by the claims set forth below.

What is claimed is:

1. A system for providing travel product information on a display device coupled with a computer system, the system comprising:

an application server that receives user inputted criteria for a search related to hotel accommodations;

a location management system that determines a location for the hotel accommodations being searched based on the inputted criteria including a keyword analysis component that analyzes at least one keyword received as part of the user inputted criteria to determine the location for the hotel accommodations being searched;

a memory component coupled with the location management system for storage of pre-defined neighborhoods which are within the location being searched, the memory component storing pre-defined boundaries of neighborhoods;

a configuration component that arranges results of the search for the hotel accommodations to be displayed by the neighborhoods defined as being associated with the searched location, the configuration component adapted to access a regional map associated with the location for display of the regional map in which the neighborhoods are identified on the regional map, the configuration component arranges results of the search for display in a matrix format such that a matrix is positioned for display in which the matrix has a first axis and a second axis and the configuration component accesses neighborhood identifiers from the memory component and configures the matrix such that the neighborhood identifiers are listed along the first axis or second axis, and wherein the neighborhood identifiers identify at least one of the pre-defined sub-locations;

the application server retrieves, for display, descriptive text associated with a neighborhood in response to user selection of at least one of (a) an actuatable section on the regional map, and (b) a data element displayed in the matrix, the application server replaces the regional map displayed with a neighborhood map corresponding to the neighborhood selected in response to the user selection and in which the application server sends information regarding points to be plotted on the neighborhood map to a mapping engine such that the plotted points are associated with geographic locations of hotels found within a neighborhood selected, and in which summary hotel information associated with a hotel is displayed in response to a cursor on the display device crossing a plotted point corresponding to the hotel; and the mapping engine determines if the plotted point overlaps at least one other plotted point and in which summary hotel information associated with each plotted point determined to be overlapping on the neighborhood map is displayed in response to the cursor crossing one of the overlapping plotted points.

2. A method of providing travel product information on a display device coupled with a computer system, the method comprising:

receiving user inputted criteria for a search related to hotel accommodations;

analyzing at least one keyword received as part of the user inputted criteria and determining a location for the hotel accommodations being searched based on the inputted criteria;

pre-defining neighborhoods which are associated with the location being searched and pre-defining boundaries of the neighborhoods;

arranging and displaying results of the search for the hotel accommodations by the neighborhoods defined as being associated with the searched location and displaying results of the search in a matrix format such that a matrix is positioned for display;

displaying the matrix having a first axis and a second axis wherein neighborhood identifiers are listed and displayed along the first axis or second axis, the neighborhood identifiers identify at least one of the pre-defined neighborhoods;

retrieving rate information for the hotel accommodations being searched;

displaying rates for the travel product as data element cells in rows and columns of the matrix such that the displayed rates are associated with a neighborhood;

accessing a regional map associated with the location;

displaying the regional map and identifying the neighborhoods on the regional map;

retrieving and displaying descriptive text associated with a neighborhood in response to user selection of at least one of (a) an actuatable section on the regional map, and (b) a data element displayed in the matrix;

replacing the regional map displayed with a neighborhood map corresponding to the neighborhood in response to the user selection;

plotting points on the neighborhood map displayed in which the plotted points are associated with geographic locations of hotels found within the neighborhood selected;

associating summary hotel information with the points that are plotted on the neighborhood map;

displaying the summary hotel information associated with a hotel in response to a cursor on the display device crossing a plotted point corresponding to the hotel;

determining that the plotted point overlaps at least one other plotted point; and displaying summary hotel information associated with each plotted point determined to be overlapping on the neighborhood map in response to the cursor crossing one of the overlapping plotted points.

* * * * *